United States Patent [19]
Matson

[11] Patent Number: 5,987,384
[45] Date of Patent: Nov. 16, 1999

[54] METHOD AND APPARATUS FOR CULLING DIRECTLY ON A HARVESTING APPARATUS

[75] Inventor: Kevin W. Matson, Ames, Iowa

[73] Assignee: Monsanto Corporation, St. Louis, Mo.

[21] Appl. No.: 08/961,228

[22] Filed: Oct. 30, 1997

[51] Int. Cl.[6] .................................................. G06F 19/00
[52] U.S. Cl. ............................................ 702/2; 56/10.2 B
[58] Field of Search ...................... 702/2, 128, 179–181,
702/187, 81–84; 56/126, 10.2 R, 10.2 A,
10.2 B

[56] References Cited

U.S. PATENT DOCUMENTS

| | | | |
|---|---|---|---|
| 4,487,278 | 12/1984 | Rosenthal | 177/25 |
| 4,852,028 | 7/1989 | Korpela et al. | 364/567 |
| 5,092,819 | 3/1992 | Schroeder et al. | 460/7 |
| 5,327,708 | 7/1994 | Gerrish | 56/1 |

OTHER PUBLICATIONS

Brim, C.A..; Johnson, Herbert W.; and Cockerham, C. Clark, "Multiple Selection Criteria in Soybeans," *Agronomy Journal,* 1958 or 1959, pp. 42–46.

Openshaw, S.J., and Hadley, H.H., "Selection Indexes to Modify Protein Concentration of Soybean Seeds," *Crop Science,* Jan.–Feb., 1984, pp. 1–4.

*Primary Examiner*—Donald E. McElheny, Jr.
*Attorney, Agent, or Firm*—Rothwell, Figg, Ernst & Kurz

[57] ABSTRACT

A combine culling apparatus for selecting product test samples has a novel culling apparatus mounted on a known combine or the like. The culling apparatus includes a collector, e.g., a cyclone, for receiving product, e.g., seeds, from the combine and a measuring compartment for receiving product from the collector. Soybeans, or other plants are arranged in a plurality of plots to be harvested. Test samples from these plots are sequentially collected by the apparatus. Test data pertaining to the plants is stored a computer system on the combine culling apparatus. Current data pertaining to a current test sample, e.g., such as yield, is collected on board the combine. The computer system on the combine selects whether to discard or to save a current test sample while on board the combine based on the current data and said stored test data. The method enables culling soybean lines and other crops directly on the combine by using a computer to calculate a check index from a set of check varieties compared to indexes of lines of interest.

39 Claims, 9 Drawing Sheets

METHOD AND APPARATUS FOR CULLING DIRECTLY ON A HARVESTING APPARATUS

BACKGROUND OF THE INVENTION

This invention pertains to methods for culling plants and the like and, more particularly, to a method for culling soybeans. The present invention teaches a method and apparatus for culling plants, such as soybeans, etc., directly on a harvesting apparatus, such as a combine or other crop harvesting equipment.

Soybean breeders typically make a cross between two varieties which are genetically dissimilar and advance the seed through generations of self pollination to a point were a single plant can be selected, which is, for the most part, homozygous at most loci and breeds true for the major traits of interest. Seeds from this plant and its subsequent generations are then tested for traits of interest including quantity and composition of protein and oil, resistance to pests (e.g., phytophthora root rot, soybean cyst nematode (SCN), brown stem rot, white mold, sudden death syndrome, stem canker, charcoal rot, etc.), appearance (e.g., lodging, pod load, and plant health), yield (usually by grain weight, volume of the grain or visual appearance), emergence (e.g., depth at which a line will emerge from or speed at which an individual emerges), nutrient deficiency or toxicity (e.g., iron deficiency chlorosis, zinc toxicity, maturity, height, molecular marker data (which are usually linked to one of the above traits of interest)), and other factors. The best individuals are kept and their progeny are tested in subsequent years until the few remaining lines are released for sale to farmers for growing. The most important factor is yield. Nevertheless, without considering the other factors, the variety may be undesirable or unusable. For example, without considering factors other than yield, the variety may not have the necessary protein or oil composition, or may produce unstable yields as pests attack the plants in different environments, or the plants may lodge so much that a farmer can not efficiently harvest the grain or finds that its appearance is objectionable.

To select lines, soybean breeders grow the progeny of a plant from a bulk population in a row called a progeny row or in a hill called a hill plot. Several such plots are grown from a population (the progeny from any one cross), and the best are selected by visual selection or by some measure of yield. The measure of yield is referred to in this present disclosure as a progeny row yield test (PRYT). Visual selection based on physically observing, or looking, at each row, is very subjective and requires a high degree of artistic talent by the breeder. Many experienced breeders believe that this technique is inefficient. In either case, a yield test of some type will be conducted in subsequent generations. A breeding program may have hundreds of thousands of individual genotypes to evaluate each year. PRYTs and other yield tests are highly laborious. The labor and expense involved in cataloging, planting, note taking, harvesting, transporting, analyzing, culling, and discarding this large number of samples is very high. Another disadvantage of the current yield test approach is the time required for harvest, analysis, selection, and getting the seed ready for shipment for replant in winter nurseries. At present, the seed industry is extremely competitive with new genotypes and traits emerging each year. The first company or entity to incorporate these traits into new varieties and to bring them to market receives a competitive advantage. Many seed companies, utilize winter nurseries in, e.g., Chile, Argentina, and Puerto Rico. To conduct meaningful tests when growing in these countries, seeds must be delivered to a testing site within a couple of weeks after they are harvested. Each soybean research station can have, e.g., 20,000 or more samples. As a result, it has been impossible to analyze, select, and cull these samples in the requisite time period with conventional means without a critical year loss in cycle time.

Current techniques include a crude culling technique wherein the yield of a sample, based on volume or weight of seeds, is compared to the yield of checks planted beside the same area as the samples of interest. The checks are harvested first, and a threshold value is marked on the cylinder or written down. All samples below the level of this threshold value are discarded. This technique has a number of disadvantages. In most crosses, the days required for soybean lines to mature varies. Lines taking longer to mature will usually have more growth and therefore out-compete earlier lines. Occasionally, the reverse can be true. Earlier lines can out-yield later maturity lines due to poor late season growing conditions or frost. For these reasons, very narrow maturity crosses are generally used with this technique. Another disadvantage is that although the checks may be planted in the general areas as the unselected lines, the size of the blocks may keep checks some distance from several lines that are selected. This means the checks do not adequately represent all the variation in the field, and the yield of the checks may therefore be unusable to compare to the unselected lines. One primary disadvantage of this technique is that selection is based only on yield and no other factors are taken into account. The price of the combines used to harvest these lines ranges from about $30,000 to well over $150,000. With the current method, a good operator can harvest one plot every 20–30 seconds and can do about 1000 plots/day. A common rule of thumb used in the industry is that the midwest will have 10 days fit for harvest. Therefore, one can expect to harvest 10,000 plots per year with each combine.

Selection indexes have been used by several individuals in several crops to select lines after all data has been collected, but not to select as data is being collected on a harvest apparatus. Computer programs which can generate selection indexes exist, but these programs have not been used to make selections while the data is being generated.

SUMMARY OF THE INVENTION

The present invention overcomes the above-noted and other problems pertaining to existing culling methods. This invention provides a significant improvement over existing methods and apparatuses for culling plants and the like and, more particularly, for culling soybeans. The present invention enables, among other things, the culling of plants, such as soybeans, corn, sorghum, wheat, cotton, etc., directly on a harvesting apparatus.

The present invention enables a substantial amount of lines to be discarded in the field. Preferably, as much as about eighty to ninety percent of the lines can be discarded in the field. The preferred embodiments of the present invention can enable most of the handling and culling to be eliminated, and the seed can be packaged directly in the field. The harvesting machine operator can work at a much higher rate and the harvest time can be greatly reduced. For example, the harvesting time can be cut in half, from about 20–30 seconds per plot to about 8–15 seconds per plot.

According to a first aspect of the invention, a method of culling product directly on a harvesting apparatus includes: sequentially collecting test samples from a plurality of plots that are harvested; using a computer to calculate a threshold index from a set of check varieties in certain plots; using the computer to calculate an index of a current test sample at a current plot on board the harvesting apparatus; using the computer to select whether to discard or to save the current test sample while on board the combine based on a comparison of the current index and the threshold index.

According to a second aspect of the invention, a method of culling test samples on a harvesting apparatus includes: designating a plurality of plots of product to be harvested; sequentially collecting test samples from the plots on a harvesting apparatus; storing test data pertaining to the product in a computer system on the harvesting apparatus; collecting current data pertaining to a current test sample at a current plot on board the harvesting apparatus; selecting with the computer whether to discard or to save the current test sample while on board the harvesting apparatus based on the current data and the stored test data.

Additional aspects of this latter method, include, e.g.:

a) designating a plurality of test areas having a plurality of rows and a plurality of tiers (ranges), each of the plots being at a specific row and tier; designating certain plots as checks; selecting whether to save or discard samples based on data collected at at least some of the checks, the stored test data including the data collected at the checks; and b) calculating a selection index value for each test sample based on at least some of the stored test data and the collected data, and the step of selecting including comparing the selection index for each test sample with a corresponding check index value that is based on the data collected at the checks.

According to a third aspect of the invention, a harvesting culling apparatus for selecting harvested test samples is provided which includes: a harvesting apparatus; a collector for receiving product from the harvesting apparatus; a measuring compartment for receiving product from the collector; a first valve between an outlet of the collector and the measuring compartment; a second valve at a discharge end of the measuring compartment; and a computer system for 1) inputting parameters pertaining to a plurality of plots of product to be harvested, 2) storing test data pertaining to the product, 3) collecting current data pertaining to a current test sample at a current plot on board the harvesting apparatus, and 4) selecting whether to discard or to save the current test sample while on board the harvesting apparatus based on the current data and the stored test data.

The above and other advantages, features and aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

Figure 1A:
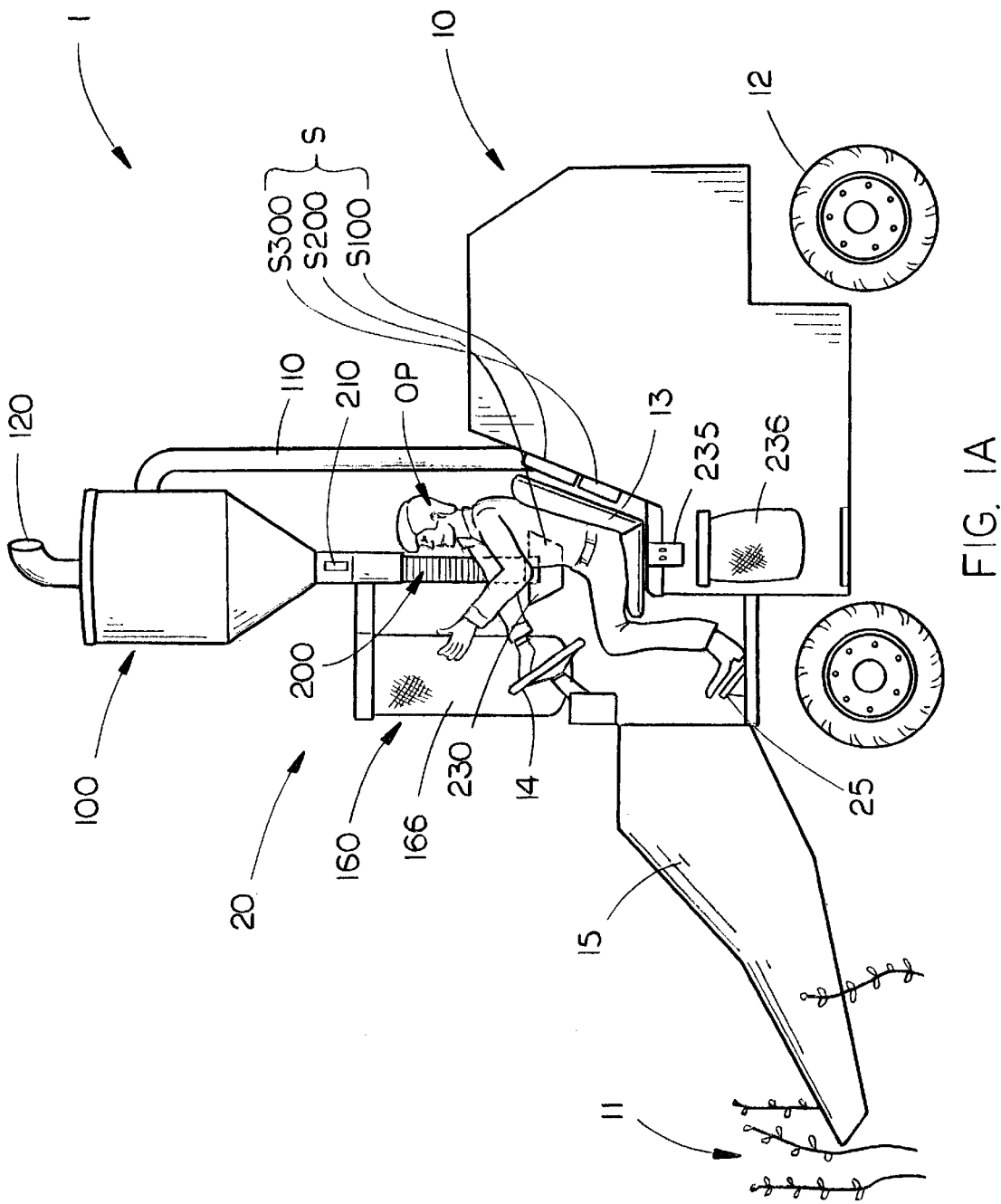
FIG. 1(A) is a side view of one preferred embodiment of the invention.

The preferred embodiments of the present invention use check placement in plots, selection indexes, computer programs, and hardware to automatically select and cull samples directly on a combine or the like based on any number of traits or inputs.

Lines are organized in tests small enough to be planted in a uniform environment, e.g., where the check variations adequately reflect the environmental variations. Preferably, entries are randomly distributed throughout the test areas, while checks are restricted to certain rows. The tests are preferably stacked next to each other (aligned with one another) so that the checks all align in the same sets of rows. This allows rows with checks to be harvested first and dumping of samples to begin as quickly as possible. Preferably, at least, about fifty to ninety percent of the lines are discarded in the field. As a result, most of the handling and culling is eliminated, and the lines can be packaged directly in the field. Because computers preferably control all relays, the operator OP can work even quicker and harvest time can be greatly reduced—e.g., approximately cut in half, from about 20–30 seconds per plot to about 8–15 seconds per plot. In addition, automatic bagging equipment, shown generally at AB in FIG. 1(C), can also be used which would allow continuous harvesting. A variety of automatic bagging systems are known and could be incorporated.

One preferred embodiment of the invention is illustrated in FIGS. 1(A)–1(D). As shown, the culling apparatus 1 includes a combine 10 or the like device. The combine 10 is a power operated harvesting machine that, e.g., cuts, threshes, and cleans grain, such as soybean lines 11. The combine 10 can include wheels 12, a driver's seat 13, a steering wheel 14, and a collector 15. The combine operates in a known manner.

Cleaned grain from the combine 10 is supplied into a unique culling apparatus 20 which is supported on the combine. The culling apparatus 20 preferably includes a) a collector 100 (preferably a cyclone) which receives product (e.g., seed) from the combine 10 by way of the input seed delivery duct 110, b) a measuring compartment 200 (preferably a cylinder) which receives product from the collector 100, c) a sensor 210 (preferably an ultrasonic sensor probe) which senses the depth of product in the measuring compartment 200, d) a valve V1 (see FIG. 1(D)) which allows grain to flow from the collector into the measuring compartment, and e) a valve V2 which opens to discharge product to a bagging location, to an automatic bagger, or to a discarding chute 230.

The measuring compartment 200 is preferably at least partially transparent so the level of product therein is visible. Preferably, the compartment 200 has horizontal indicia 215 so that the volume therein can be visually observed by the operator OP. The volume, or yield, of the grain can easily be calculated, e.g., by multiplying the depth of the grain by the base area of the compartment when the compartment has a constant vertical cross-sectional area or measured by ultrasonic sensors detecting matter and seed weights from load cell. Although a cylindrical cross-sectional shape is preferred, e.g., a measuring cylinder, other less preferred configurations and cross-sections of the measuring compartment can be used.

Figure 1C:
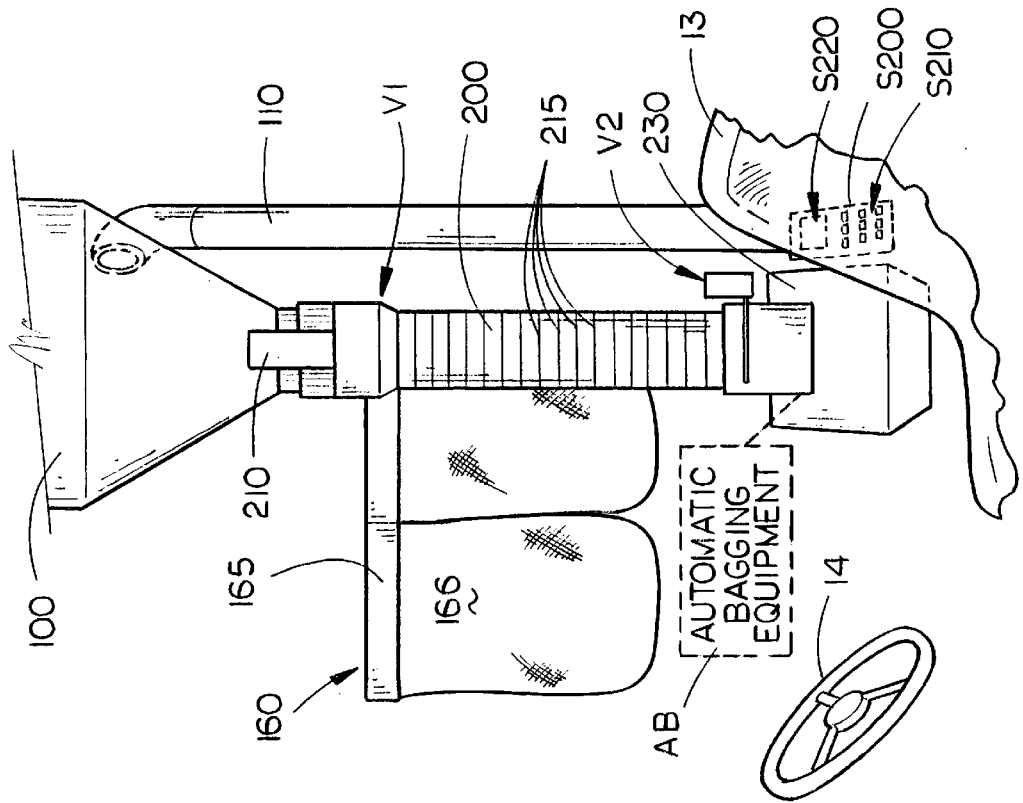
FIG. 1(C) is a side view showing an enlarged section of the embodiment shown in FIG. 1.
Figure 1B:
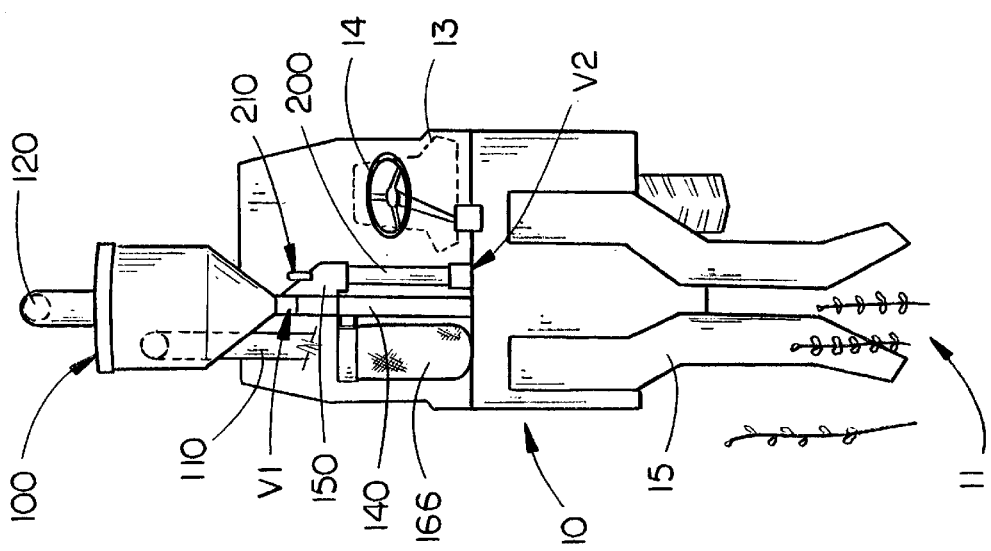
FIG. 1(B) is a front view of the embodiment shown in FIG. 1.

The seed or grain is blown by air into the cyclone 100, leaving seed or grain inside the cyclone (to exit from the bottom) while air is discharged through the top outlet 120. Although a cyclone is the preferred type of collector 100, other collectors, such as various collecting tanks and product delivery means and the like can be used. As shown in FIG. 1(B), the cyclone is preferably supported via a support shaft 140. The cyclone has a bottom outlet that communicates with an inclined passage 150 that extends horizontally to the top of the measuring cylinder 200. The inclined passage 150 provides a suitable position above the measuring cylinder 200 for the placement of a sensor 210. As shown in FIGS. 1(A)–1(C), the device can also include at least one saved bag container 160 for holding saved test bags, etc., of seeds or grain. The container(s) 160 can include, for example, an upper metal loop member 165 and a flexible bag body 166.

Figure 1D:
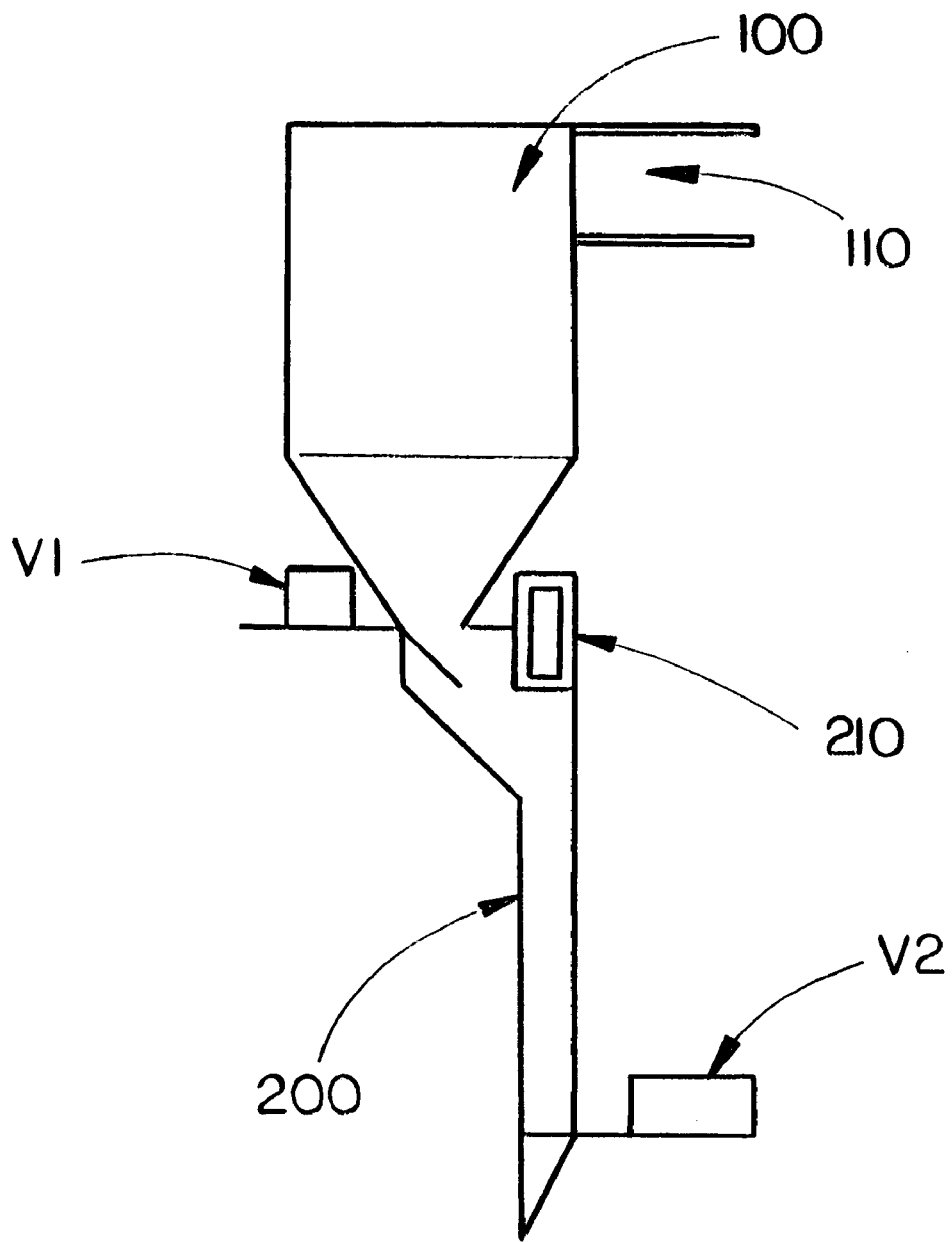
FIG. 1(D) is a schematic side view of portions of the culling apparatus according to a preferred embodiment of the invention.

The valve V1, best shown in FIG. 1(D), preferably includes a windshield wiper motor and a flapper valve which opens to allow grain to flow from the cyclone 100 to the measuring cylinder 200. And, the valve V2 preferably includes a linear actuator and a knife valve which opens to discharge seed to an automatic bagger, to a discharge chute, etc. The valve V1 separates the cyclone 100 from the measuring cylinder 200, and the valve V2 closes the bottom of the measuring cylinder V2. As should be readily understood, it is contemplated that other known valve mechanisms can be used. Although computer controlled valves are clearly most preferred, it is even contemplated that manually operated valves could be used in alternate embodiments. As shown in FIG. 1(A), the discharge chute 230 can be connected by a conduit 235 to a discharge bag 236 located, e.g., beneath the seat 13 of the operator.

The combine apparatus 20 also includes a control system S, which, as shown in FIG. 1(A), preferably includes a control computer S100 and an analytic computer S200. As discussed further below, the control computer S100 is preferably an interface computer which controls relays (e.g., inside the relay box S300), senses switch closure (e.g., closure of a foot switch 25), converts analogue signals to digital signals (e.g., such as signals from an ultrasonic sensor probe), and communicates with the analytical computer S200 via a serial interface, and the analytical computer S200 is preferably a computer which runs various programs in the operation of the apparatus, such as, e.g., a selection program, and houses data, such as, e.g., a harvest order file, and index files. The files and programs are preferably loaded in the analytical computer via a desk top computer (not shown), or can be entered into a keypad, etc., of the analytic computer itself.

Figure 2A:
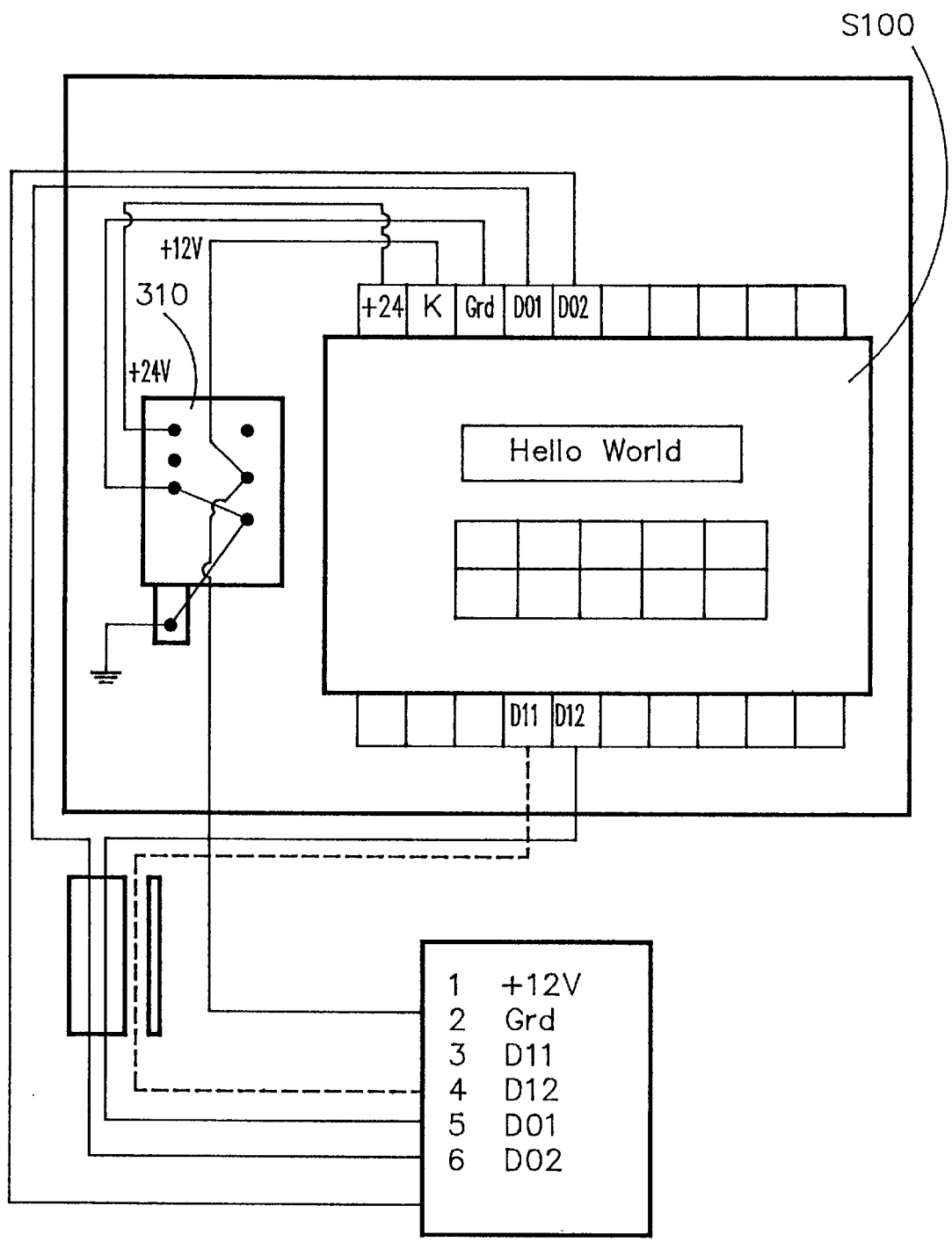
FIG. 2(A) is a schematic diagram of the control computer according to one preferred embodiment of the invention.
Figure 2B:
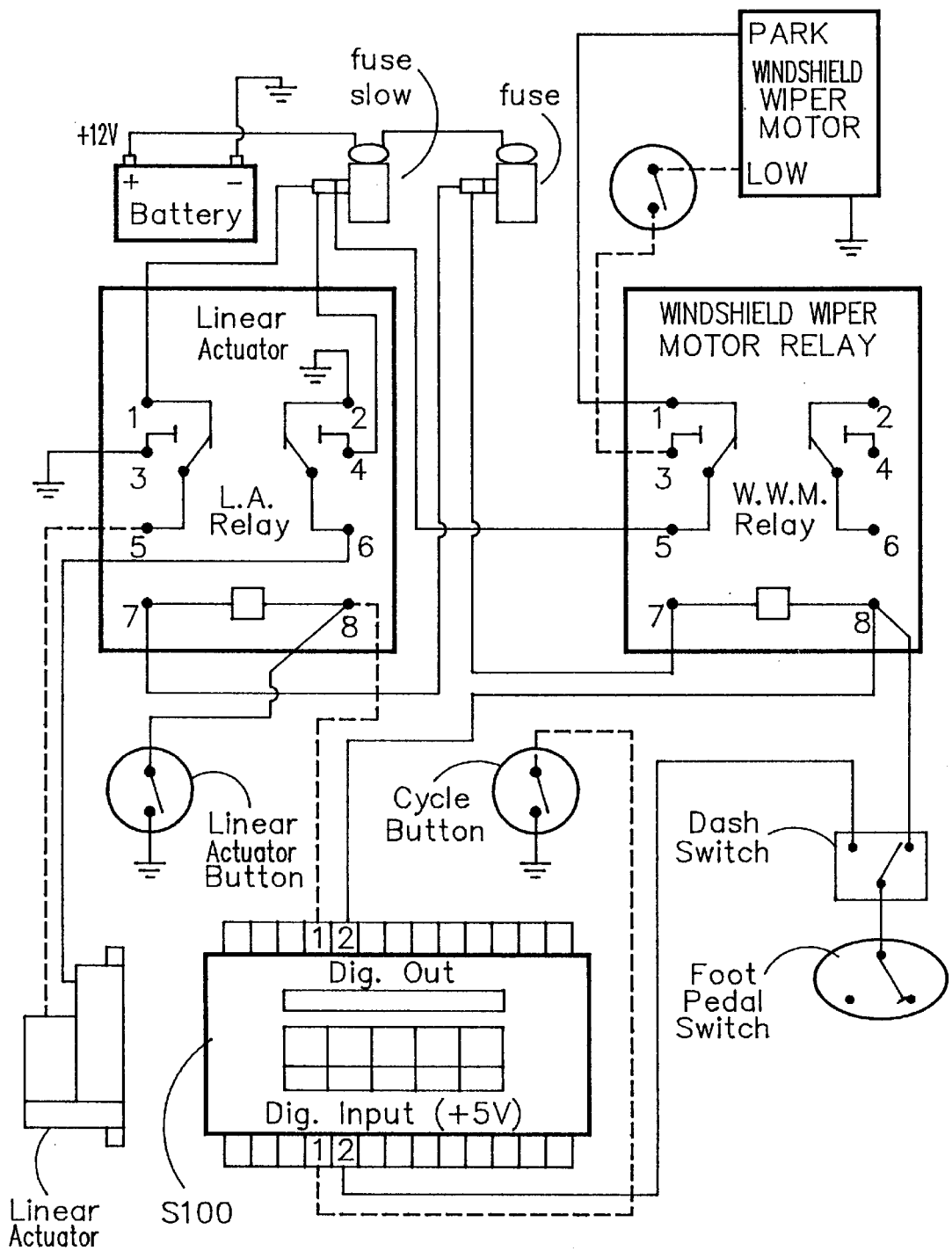
FIGS. 2(B)–2(C) are schematic diagrams showing wiring of the control computer and the control system according to one preferred embodiment of the invention.
Figure 2C:
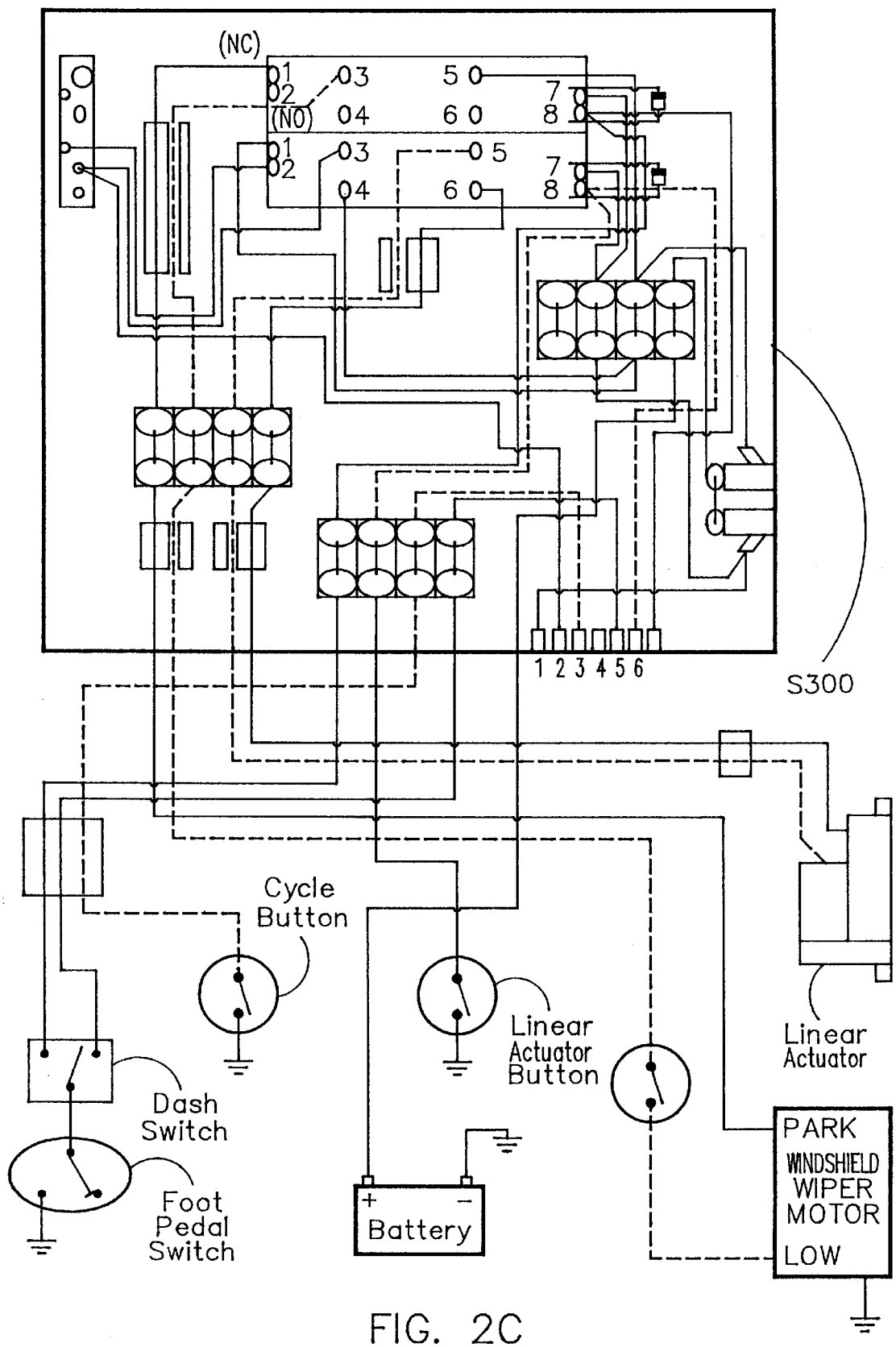

One exemplary arrangement of the control system is illustrated in FIGS. 2(A)–2(C). FIG. 2(A) shows the control computer S100, as well as a 12V–24V DC to DC converter power supply 310. The DC to DC converter can be used to, e.g., power the ultrasonic sensor and the control computer. FIGS. 2(B)–2(C) illustrate exemplary wiring of, e.g., the linear actuator relay and the windshield wiper relay which operate the respective valves V2 and V1. The relay box S300 contains relays for cycling the hoppers, via valves V1 and V2, and provides a connector to get power to the control computer and signals back therefrom (FIG. 2(B)).

In a most preferred embodiment, manual overrides are provided in order to allow the operator to continue harvesting upon failure of the computer system.

In summary, upon entering the field, the operator OP sets up the analytical computer S200 with the size of the area or block to be harvested and the proper range, row coordinates, and desired harvest options. The operator then harvests the first plot, and the first plot is stored in the cyclone 100 until it is cycled down by the operator. The second plot is then harvested. The volume of grain is either a) keyed in by the operator (e.g., into a keypad S210 of the analytic computer) directly or b) sensed by the control computer (e.g., via the ultrasonic sensor 210) and passed to the analytical computer via a serial port. A selection index (see below) is then calculated using the information from data and index files. If the sample is a check, the data is recorded and the check selection index is updated (see below); the analytical computer then sends a signal back to the controller to dump the sample and cycle the next plot down from the cyclone. If the sample is not a check, selection is attempted based on the selection scheme for the test (see below). If insufficient checks have been harvested, or if the sample is above the calculated threshold, it is classified as a save and the operator is instructed (e.g., on a screen S220 of the analytic computer) to bag the sample (or the sample is sent to an automatic bagger). The control computer S100 then waits for the foot pedal switch 25 to be closed, and sends a signal indicative of this closure to the analytical computer S200. In turn, the analytic computer S200 signals the controller computer S100 to dump the sample and to cycle the next plot from the cyclone 100. If the sample is below a threshold value (see below), the sample is dumped, and the next sample is cycled from the cyclone. After sending the signal to dump or save a sample, the analytic computer advances itself to the next plot. Data from each sample is stored in a single record of a combine data file (.DAC) including the selection index. The analytic and control computers allow the operator to adjust the cycle to allow the most efficient harvest; relays are timed to open and close the valves V1 and V2 so that the last of the previous sample will be delivered to the cyclone as the next plot enters the combine. Then, just before the two would contaminate each other, the valve V1 at the bottom of the cyclone is closed. This process and the on board dumping greatly increase the speed of harvesting plots.

Figure 3A:
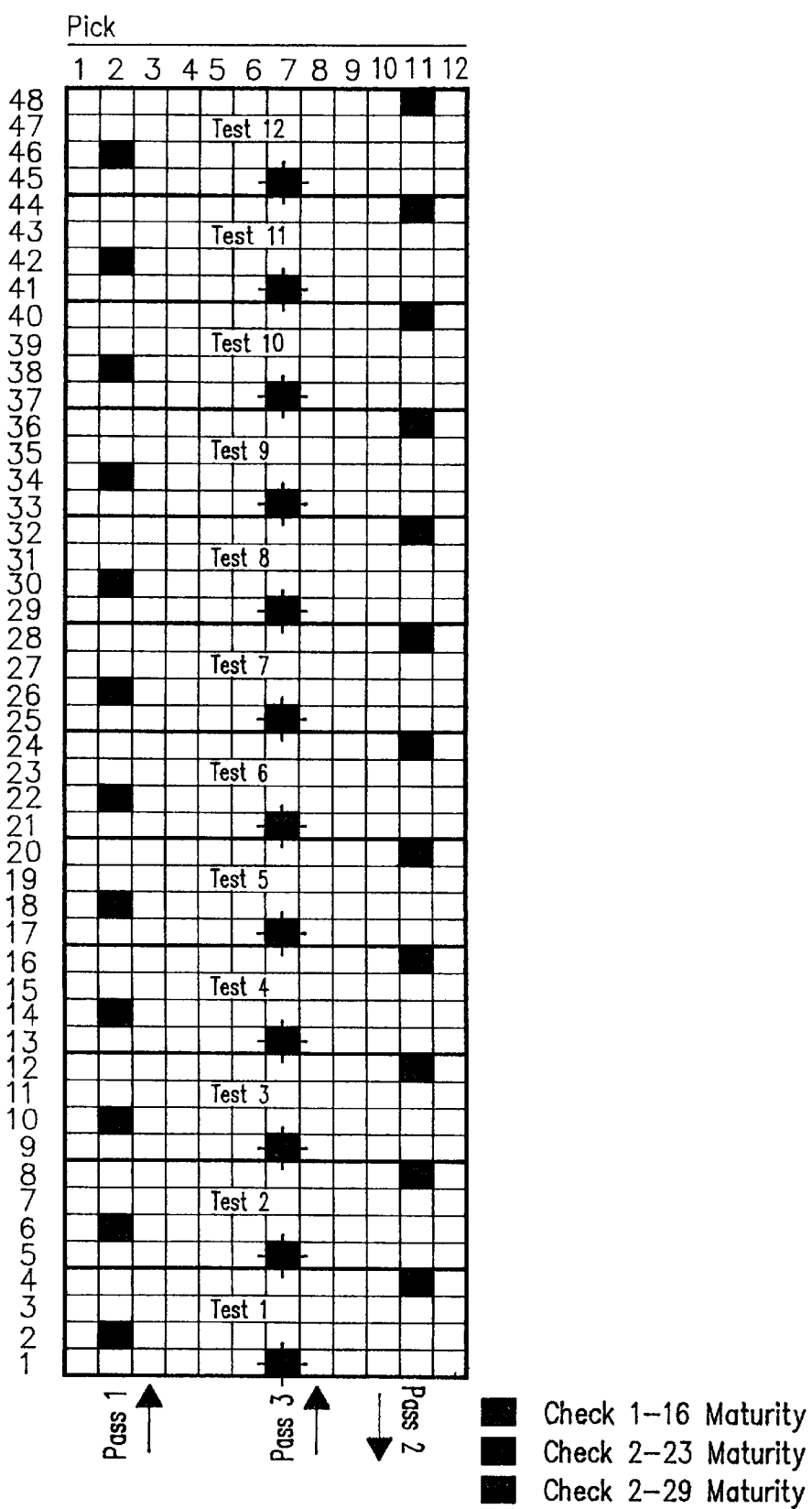
FIGS. 3(A)–3(C) are charts illustrating various examples of field arrangements with checks at specified plot locations within test areas.
Figure 3B:
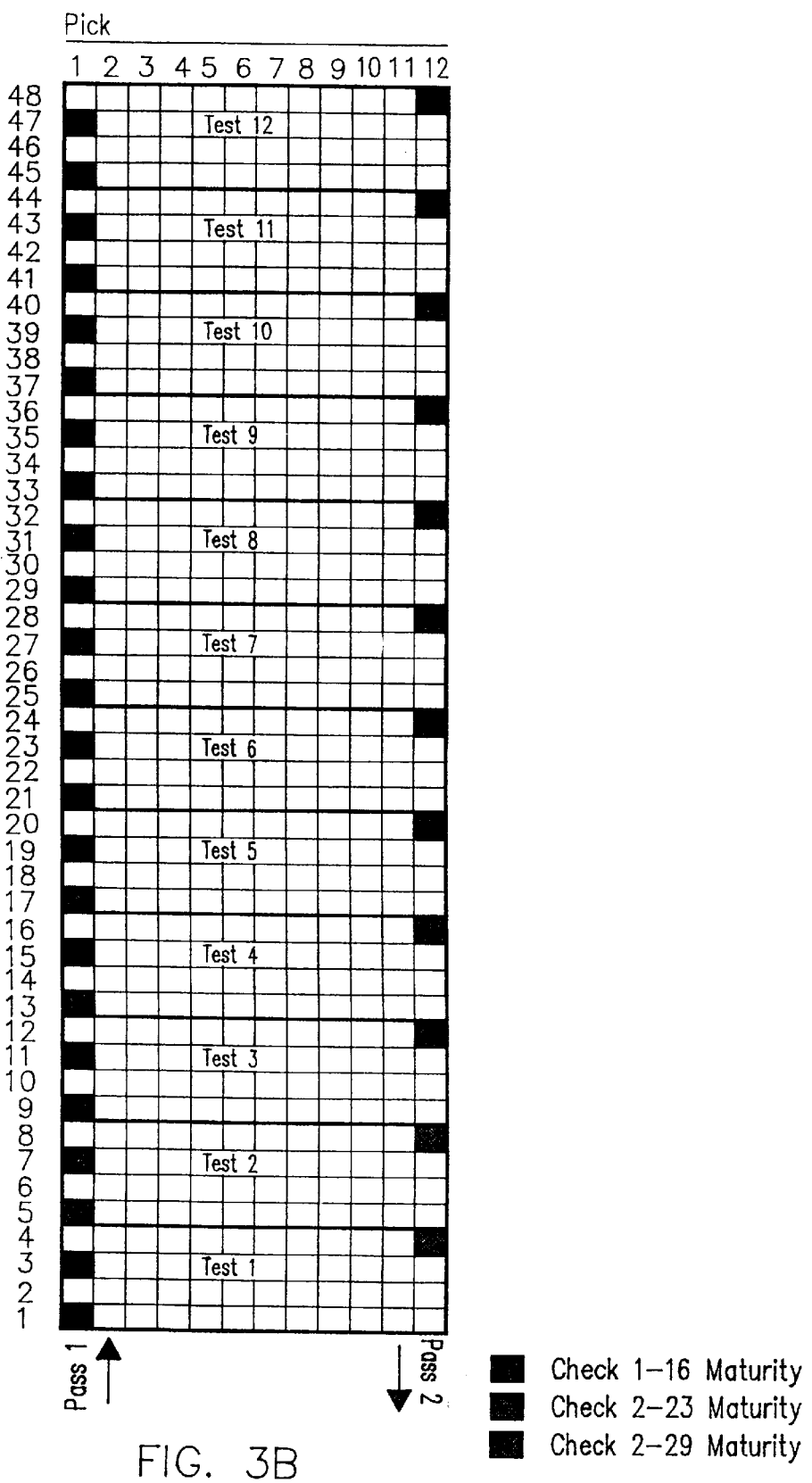
Figure 3C:
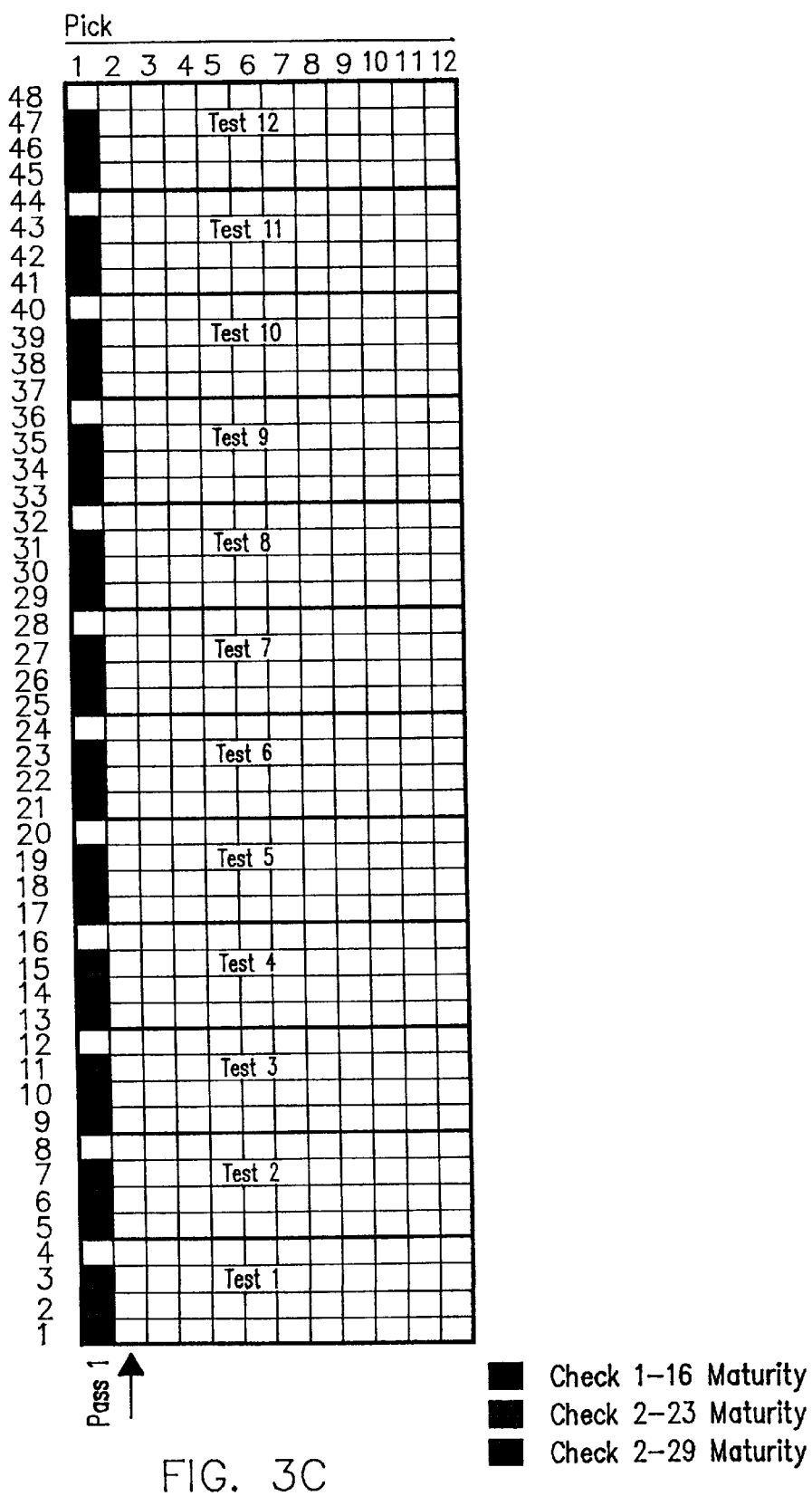

Field Plan Setup:

In order to use the present method and apparatus, a field area which is to be tested is set up, or arranged, appropriately. FIGS. 3(A)–3(C) illustrate three different examples of field areas to be harvested which include a plurality of plots arranged in rows and tiers (lines are arranged in rows). The colored plots represent checks. As shown, the field area includes a plurality of test areas, which include corresponding checks (three checks are shown for each test area). In FIGS. 3(A)–3(C), the order of harvest is indicated by the pass number, and the direction of travel is indicated by the arrows illustrated.

In creating an appropriate field plan set up, the analytical computer S200 can be used to perform the following. First, files can be made which have one record entry for each line. Database records also work. Second, files can be made with one record for each check entry. Third, a first program, PRYTGEN, can be used to combine the above files so that check entries are properly positioned in the field. Each check is denoted with, e.g., a "~". This is a rarely used character so that subsequent programs can identify the checks by the "~" in the proper position. As shown in FIGS. 3(A)–3(C), a variety of different field arrangements are possible. For combines which cannot fit between passes, the checks can be placed on the outside pass, e.g., such as shown FIG. 3(B).

For those who prefer to harvest all checks first so that all lines are subjected to selection, the checks can be placed, e.g., in the first three positions on the outside pass as shown in FIG. 3(C). A preferred method is to distribute the checks, e.g., to place the checks on the second, middle, and next to last passes to better sample the variation, e.g., such as shown in FIG. 3(A). It should be understood that other arrangements and placements of checks could be used, and more or less checks could also be used for each test area. Fourth, a second program, such as SAS, AgriBase or MSTAT can be used to generate the field planting plans assigning tier (or range) and row coordinates and to set up files needed for notes. From these plans, tests and blocks are set up and planted. Other variations of the method and apparatus for performing the field plan setup, which would be understood by those in the art, can also be used.

Data Entry:

As discussed below, the present invention can make selections based on analyses, etc., of various data. Data can be, for example, entered into the analytical computer S200. Data entry can involve, e.g., the use of a third program, DLBOOK, that runs on a hand-held computer or a desk top computer. This third program can be used to enter data into data files called ".DAT" files.

Data can come from the field, greenhouse, molecular data, or can be edited from other sources using a standard text editor such as Kedit, SAS, Microsoft Excel or Word. Data can come from, e.g., on board testing (e.g., such as via an ultrasonic probe), on board entering of data, or pre-entering of data. The following descriptions will clarify the various types of data that can be stored and the various places such data can come from.

Selection Methods And Selection Indexes:

Selection of culling samples is conducted by comparing samples with the checks. "Selection indexes" of the samples are compared with corresponding indexes of the checks. As discussed below, there are a variety of "selection indexes" that can be used and a variety of methods for selecting samples, e.g., by comparing indexes, that can also be used. Based upon this comparison, among other things, an operator can determine whether to discard the sample or to save the sample, while on the harvesting apparatus.

In one exemplary embodiment, the analytical computer S200 can run a fourth program, PRYTSET, a desk top program, which sets up selection criteria by the number of traits and a weighting of each trait used in the selection. The program can use, e.g., one or more of the following five methods of selection: (1) a mean of the checks method, (2) a high check method, (3) a low check method, (4) a save all method, or (5) a save the top number of selected lines method. If one of the first three methods is used, the program prompts for a threshold value of the checks (a percentage of the checks will be discarded, i.e., in relation to the mean, the highest, or the lowest check). The program then finds the position of all the checks by looking for the '~' in the proper column. For each block, an index (.IND) file is created which has one record for each test. Each record contains all the above information entered. Therefore, selection criteria can be varied with each test.

As noted, selection can be based on several methods and, in one preferred embodiment, the programs presented here accommodate five methods: 1) the save all method; 2) the high check method; 3) the low check method; 4) the mean of the checks method; or 5) the save the top number of selected lines method. Each experiment within a block can use any of these methods, independently of the selection scheme used in neighboring tests.

(1) The save all method is the simplest method wherein all entries are saved regardless of their index values. This method is usually used for tests in which all entries are saved for study.

(2) The high check method based on the index value of the highest check can also be useful. Selection can begin as soon as the first check within a test is harvested. Each subsequent entry harvested within that test will be compared to that line until a new check is found which has a higher index value. At which time, this new check is used to set the selection criteria.

(3) The low check method is probably the most conservative. All checks must be harvested before selection can begin. The one with the lowest index value is used to set the selection criteria. That is, within a certain test area, all three checks must be harvested before dumping begins.

(4) The mean of the checks method is the one anticipated as being most commonly used in this invention. As with the low check method, selection begins after all checks are harvested. The mean of the checks index values is used to set the selection criteria. This can provide a more stable value because bad check plots make up only about ⅓ of the total. The mean also appears to help in selecting across a range of maturity, as long as the lines to be selected are within the same range as the checks.

(5) The save the top number of selected lines method involves ranking entrees based on their index values. If the index value is not within the top number of entries specified, it is discarded. This method will likely save more lines than are specified because lines saved at first will likely later fall below the top spots after additional lines are harvested. This method begins when the selected number of entries has been harvested.

It should be apparent that a variety of other selection methods could be utilized. For example, another method could include dumping after a certain total number of saves. For the selection methods 2–4, an additional parameter is preferably used to select a percentage of the index value which the entry must beat to be saved. This figure is expressed as a decimal—e.g., if only those lines which were 110% the value of the mean of the checks were selected, then this would be set at 1.10. Then, only those entries with index values that were 10% greater than the mean of the checks index value would be saved.

Selection indexes can be calculated so that several factors can be accounted for simultaneously when selecting individuals from a population.

The index value can be the sum of the factors which a breeder considers important weighed by a coefficient which the breeder believes expresses the relative importance of that trait. Weighting coefficients can also be used to equalize differences between two factors due to differences in the units of measure. For example, if a breeder desires to breed for high % protein (P), % oil (O) and yield (Y), protein may be twice as important as oil. Accordingly, he may weight protein by a coefficient of 2, while leaving the oil coefficient at one and putting the yield coefficient at 0.75. The selection index is then calculated by summing each factor by its coefficient weighting factor as follows.

$$\text{Index value}=(2*P)+(1*O)+(0.75*Y).$$

If individual A has 42% protein, 18% oil, and yields 55 bushels/acre, then individual A's index value=(2*42)+(1*18)+(0.75*55)=84+18+41.25=143.25.

If individual B has 41% protein, 19% oil, and yields 56 bushels/acre, then individual B's index value=(2*41)+(1*19)+(0.75*56)=82+19+42=143.

Individual A has the higher index value and would be the better line to save under this selection index even though it had a lower yield and less oil.

Operation:

A detailed, step-by-step, summary of the operation of one exemplary embodiment of the invention is as follows:

1. Upon entering the field, the operator OP initializes the analytical computer S200 with the following parameters:
   a) First and last tiers to harvest.
   b) First and last rows to harvest.
   c) Current tier-row.
   d) Direction of travel (tiers increasing or decreasing).
   e) Row start harvest option.
      1) One way—each row begins with the same tier and the cutting direction is always as specified in d.
      2) Both ways—each row begins on the last tier in the previous row harvested and the cutting direction specified in d is alternated with each row.
   f) Delay time #1 and delay time #2 in seconds.
2. The operator then harvests the first plot, and the cleaned grain is blown into the cyclone 100.
3. The operator then cycles the seed down to the measuring cylinder 200 by pressing a switch (e.g., a foot switch 25 in the preferred embodiment) which manually runs valve V1.
4. The operator then enters the automatic harvest cycle on the analytical computer S200. Upon entry into this part of the program, the analytical computer S200 sends a signal to the control computer S100 which triggers it to sense the depth of grain in the measuring cylinder 200 using the sensor 210 (preferably an ultrasonic probe). The probe 210 provides an analog current that is proportional to the depth of grain in the measuring cylinder. The control computer S100 then converts this analog signal to a digital signal and passes it to the analytical computer S200 via serial ports on both computers. The program also allows the depth of grain to be keyed directly into the keypad S210 of the analytical computer S200 by the operator, such as by viewing indicia 215.
5. The second plot can be harvested while step 6 below is conducted; step 6 can also begin earlier, etc., as appropriate.
6. From the data collected by the ultrasonic probe and the on board data from the data file(s), a selection index is calculated (as discussed above).
   a) If the sample is a check, the data is recorded and the selection index is updated. This check sample is then classified as a dump, and the program proceeds to step 7 below.
   b) If the sample is not a check, the program checks to see if the required number of checks have been harvested for the test. If so, selection is attempted based on the method of selection under the criteria selection setup discussed above. If not, the sample is classified as a save.
      1) If the calculated index is above the threshold value calculated from the checks, it is classified as a save.
      2) If the sample is below the threshold value, it is classified as a dump.
7. A record is then written to the DAC file containing the following information.
   a) The tier and row.
   b) A bar code designation (e.g., samples can be bar coded, such as if an automatic bagger is used).
   c) The selection index value.
   d) The measuring cylinder reading.
   e) The save value (0=dumped, and 1=saved).
8. If the sample is classified as a dump, step 10 below automatically starts.
9. If the sample is classified as a save:
   a) the sample can be sent to an automatic packager equipped on the apparatus; or
   b) the operator can be instructed to bag the sample. For example, when the operator presses a foot pedal 25, indicating that he is ready to catch the sample, the control computer S100 can sense the switch closure and can send a signal to the analytical computer S200 indicating that a foot pedal switch has closed.
10. The following sequence then occurs.
    a) The analytical computer S200 sends the delay time #1 and the delay time #2 to the controller.
    b) The controller computer S100 then:
       1) opens the valve V2;
       2) waits the specified delay time #1;
       3) closes the valve V2;
       4) uses the ultrasonic probe 210 to sense the depth of the cylinder 200 without grain;
       5) opens the valve V1;
       6) delays the specified delay time #2;
       7) closes the valve V1;
       8) uses the ultrasonic probe 210 to sense the depth of the grain in the cylinder 200; and
       9) relays information to the analytical computer S200.
    c) The controller computer S100 then advances one tier.
    d) After step 10)b)2) above, the operator begins to harvest the next plot. If the sample is a save, and if no automatic bagger is used, then the operator holds the bag of seed as the next plot is harvested. Then, after the last plant enters the combine and while the combine is threshing and cleaning the grain, the operator ties a label on the bag with the sample from that prior plot and puts the bag in the save bin 160.
11. After step 10, the process is repeated at step 6 for the new plot.
12. After a record of the data is written to the DAC file in step 7, the tier is incremented, or decremented depending on direction of travel. If the resultant tier is outside the range specified in step 1. Then, the row is incremented to the next row specified in the harvest row order file, and the tiers are reset according to the condition of the parameter set in steps 1 a, d, and e. The cycle is then repeated at step 6. If the last row has been harvested, the computer prints, e.g., "That's all" and exits the program, closing all files.

The analytical computer S200 and the control computer S100 allow the operator to adjust the cycle to allow the most efficient harvest. Relays are timed to open and close so that the last of the previous sample will be delivered to the cyclone 100 as the next plot enters the combine, and, then, just before the two would contaminate one another, the valve V1 closes. The computer control of the valves V1 and V2 and the onboard dumping of the samples, greatly speeds up the rate at which plots can be harvested—even over systems where no data is recorded. With this system, preferably, at least about 80–90% of the samples are dumped in the field. Before this system, a new, untrained, operator could harvest about 500 plots/day and could possibly advance to about 1000 plots/day within a couple of weeks. With this new system, a new operator can harvest 1000 plots/day and could even obtain 1500 plots/day or more.

It should be understood that the control system or computer system S can, alternatively, have a single computer for performing the functions of both the analytical and control computers, or, alternatively, additional computers or processors could be added for certain functions. In addition, the harvesting apparatus can include remote communication means for communicating to a computer at another location, which other computer can perform certain functions.

Further Analyses:

In the present invention, all data can be recorded (e.g., in the analytical computer) so that further analyses are possible—unlike other culling systems.

The invention preferably includes a sixth program, SAS, that merges information from several files together including, for example, pedigree, index values, raw cylinder readings, molecular data, maturity, lodging, etc. The invention preferably also includes a seventh program, using SAS, that divides tests within a block file into individual test files. The invention preferably also includes another program using SAS, that calculates analysis of variance and means.

Exemplary Embodiments:

A number of exemplary embodiments of the invention are discussed in the following paragraphs.

EXAMPLE 1

Soybean cyst nematodes (SCN) are pests which cause the greatest loss of yield in soybeans. The most economical way to protect varieties from these pests is to obtain resistant varieties. SCN resistance is complicated and involves multiple loci. In the northern United States, SCN has not been viewed as a significant problem, but it is now becoming very prevalent. Therefore, the source of resistance must come from southern varieties where varietal development of SCN lines is more advanced or from plant introductions. Either of these are poorly adapted for the northern soybean growing areas. As a result, progress to bring high yielding SCN resistant cultivars to market has been slow.

The following selection index was used to select high yielding lines and yet give a slight edge to those varieties which confirmed SCN resistance.

INDEX=Yield+(−0.7)*Maturity+(−2)*General appearance rating+20* SCN rating, where, in this example:

Yield: is a sample's volume as given by a 2" diameter cylinder with a scale of 0–100.

Maturity: is given in ⅓ maturity groups—i.e., 16,19, 23, 26, 29, etc. A value of a 16 would represent a mid maturity group 1 variety, and a value of 23 would represent an early maturity group 2 variety. The effect of using different coefficients can be seen below. In the chart below, all cylinder readings within one column are regarded as equal after maturity correction by the factor given for that column.

|  |  | Correction Factor | | |
|---|---|---|---|---|
|  |  | 0.7 | 1.0 | 1.2 |
| Maturity | 9 | 59 | 50 | 44 |
|  | 13 | 62 | 54 | 49 |
|  | 16 | 64 | 57 | 52 |
|  | 19 | 66 | 60 | 56 |

-continued

|  | Correction Factor | | |
|---|---|---|---|
|  | 0.7 | 1.0 | 1.2 |
| 23 | 69 | 64 | 61 |
| 26 | 71 | 67 | 64 |
| 29 | 73 | 70 | 68 |
| 33 | 76 | 74 | 73 |
| 36 | 78 | 77 | 76 |
| 39 | 80 | 80 | 80 |

Cylinder Readings Corresponding To Maturity And Maturity Correction Factors

General appearance rating: is an appearance rating on a scale from 1–5 where 1 is extremely attractive and 5 is very ugly and usually prostrate.
*SCN rating: is a rating of 1 if the sample is resistant or moderately resistant and a 0 if it is susceptible.

This data was generally generated by a greenhouse screen after planting. All checks were given a "0" rating. Therefore, the last term will be "0" except for resistant lines. A value of 20 is added to the index value of resistant lines to ensure that they are saved if the other factors bring the index value close to the threshold value. This technique also helps select high yielding samples without resistance in SCN populations because this part of the expression will be zero and will not enter into the calculations, therefore, they are not penalized when compared to the susceptible checks. The maturity coefficient (−0.7) was calculated using regression on advanced yield plots, and has worked well, and it has been used for the maturity coefficient to select earlier lines.

The general rating coefficient value of (−2) works well for most populations where most unattractive lines should be removed. Values of, e.g., (−1) or (0) can also be used in populations where less attractive lines could be tolerated.

EXAMPLE 2

This example has utility in, e.g., selecting individuals used in genetics studies, especially a mapping population. In this example, putative DNA markers have been correlated with quantitative linked loci (QTL) for higher yield. To test these markers, individuals are desired which have the markers in the favorable condition to compare to those that have the markers in the unfavorable condition.

Before planting, nothing is known about the population except that the parents differ in QTL composition so that the progeny will segregate for the markers of interest. After planting and yield tests in the configuration given above, DNA is taken from the leaves and tested for the markers associated with the QTL's. From the DNA work, several individuals are identified which have the marker in the favorable and unfavorable condition. Individuals at both extremes of marker condition are selected—both must be harvested to test this theory in future years. Data files are created which have the tier and row coordinates for each of the individuals. Data are then added from the molecular markers and from field observations including maturity and general rating. For the molecular data, a "1" is entered if the individual should be saved based on it's molecular data alone, and a "0" is entered otherwise. The checks all receive "0" s.

The selection index is then generated using the PRYTSET program. The following 4 traits are involved:

1. Yield: which is measured from the depth of grain in the cylinder (Y);
2. Maturity: which is in ⅓ maturity groups (MA);
3. General appearance: rating at harvest (G);
4. Molecular: save 1, or 0 (MO);

The weighting is as follows:

Y is weighted as 1;

MA is weighted as −0.7;

G is weighted as −2; and

MO is weighted as 200.

In this example, the only selected lines were 110% of the mean of the 3 checks.

Therefore, the index value (1*Y)+(0.7*MA)+(−2*G)+(200*MO). Y is a number between 0 and 100. MA is a number between 03 and 56. G is a number from 1 to 5. MO is a 0 or 1; MO for checks will always be 0.

For checks and non-marker selected lines (where MO=0), the first 3 terms are the only ones which enter into the equation, and these lines are selected based only on these three factors. For marker selected lines (MO=1), the fourth term will equal 200. Because the range of values for the first 3 terms is between a minimum value of −49.2 and a maximum value of 95.9, the possible range of values for lines with MO=1 is from 150.8 to 295.9. The largest mean of the checks value is 95.9. Therefore, the greatest selection index threshold is, e.g., 110% of 95.9, or 105.5, which is less than any possible values for MO=1 lines. Therefore, all MO=1 lines are automatically selected.

EXAMPLE 3

Use of the system where molecular marker data is known. The present assignee has developed systems to identify marker alleles which are linked to yield QTLs, and, from regression, the applicants have assigned these loci regression coefficients values that denote their importance in yield. Parents are selected which, when combined can accumulate as many of these alleles as possible (Table 1).

TABLE 1

| | Locus | | | | | | | | | |
|---|---|---|---|---|---|---|---|---|---|---|
| Locus Name | 1 | 2 | 3 | 4 | 5 | 6 | 7 | 8 | 9 | 10 |
| Parent A | 1 | 1 | 1 | 0 | 1 | 0 | 1 | | 0 | 1 | 1 |
| Parent B | 1 | 0 | 1 | 1 | 1 | 0 | 1 | | 1 | 1 | 1 |
| Ideal Progeny | 1 | 1 | 1 | 1 | 1 | 1 | 1 | | 1 | 1 | 1 |
| Regression Coefficient | 4.2 | 2.1 | 3.1 | 3.4 | 2.2 | .2 | 6.2 | 12 | 1.0 | 1.2 |

The value "1" at a locus denotes that the favorable allele is present. While, a "0" indicates that the unfavorable allele is present. In the above example, loci 1, 3, 5, 7, 9, and 10 are said to be fixed in the favorable condition and will not segregate. Locus 6 is fixed in the unfavorable condition and also will not segregate. Loci 2, 4, and 8 will segregate. Crosses are made between parent A and B and the progeny are selfed by single pod, single seed, or some other method to a point where a large number of loci have been fixed. At this point, individual plants are harvested and the seed from each plant is used to plant one plot. Plants originating from the same or different parents are placed in a test along with the standard checks. These plots are arranged and planted as has previously been described. Leaf samples are taken from these plants at an early stage of development. DNA is extracted from these samples. The DNA is subjected to markers which identify loci 2, 4, and 8 which the parents do not have in common. The samples are scored for presence or absence of the marker allele. Examples are given in Table 2.

TABLE 2

Scores of Plant Rows for Selected Loci

| | Locus | | |
|---|---|---|---|
| Plant Row # | 2 | 4 | 8 |
| 1001 | 1 | 1 | 0 |
| 1002 | 1 | 0 | 1 |
| 1003 | 1 | 1 | 1 |
| 1004 | 0 | 1 | 0 |
| 1005 | 0 | 0 | 0 |
| 1006 | 1 | 1 | 1 |
| 1007 | 1 | 0 | 1 |
| 1008 | 0 | 0 | 1 |
| 1009 | 1 | 0 | 0 |

A table or array is constructed similar to Table 2 in which rows represent the plot or individual plant row and the columns are the marker loci. For loci which have 2 alleles, the value in a cell will be a "1" if that individual has the favorable marker locus allele and a "0" if the marker locus is unfavorable. This information is then merged with agronomic information such as maturity and appearance.

TABLE 3

Scores of Plant Rows for Selected Loci

| | | | Locus | | |
|---|---|---|---|---|---|
| Plant Row # | Maturity | Appearance | 2 | 4 | 8 |
| 1001 | 23 | 1 | 1 | 1 | 0 |
| Check 1 | 19 | 1 | 1 | 0 | 0 |
| 1002 | 26 | 3 | 1 | 0 | 1 |
| 1003 | 23 | 3 | 1 | 1 | 1 |
| 1004 | 29 | 4 | 0 | 1 | 0 |
| Check 2 | 25 | 2 | 0 | 1 | 1 |
| 1005 | 19 | 2 | 0 | 0 | 0 |
| 1006 | 26 | 2 | 1 | 1 | 1 |
| 1007 | 23 | 2 | 1 | 0 | 1 |
| 1008 | 23 | 3 | 0 | 0 | 1 |
| Check 3 | 29 | 2 | 1 | 0 | 0 |
| 1009 | 29 | 2 | 1 | 0 | 0 |
| etc. | | | | | |

The resultant file will be called a data file, and it has one record for each plant row or check which is in the same order as the plants are in the field. Program PRYTSET can then be used to develop a selection index. Each locus is weighed by the coefficient calculated for that locus. This is illustrated in the following. Six traits, e.g., will be used in the selection index. Trait 1 is the yield value, which is obtained at harvest in the field, and which will have a multiplier of 1. Trait 2 is the maturity, which will have a multiplier of (−0.7). Trait 3 is the appearance, which will have a multiplier of (−2). Traits 4–7 will be loci 2, 4, and 8. They will have multipliers 2.1, 3.4 and 12, respectively. Accordingly, the following formula expresses the index value for each line.

Index value=(1*yield value)+(−0.7*maturity)+(−2*appearance)+(2.1*locus 2) +(3.4*locus 4)+(12*locus 8).

The techniques of the present invention can easily be applied to other traits and crops with little or no modifications. To use molecular data for yield, an additional term is added to the index for each locus. They are weighted by their importance from an allele value determination calculation. Data files would have a "0" if the individual does not have the desired allele or a "1" if it has the desired allele. In this way, the value of the locus is added to equation only if the allele is present at that locus. Loci coefficients could also be used as in the SCN example if they were linked to disease resistance genes, or any disease ratings could be used as the general rating or maturity.

With the technique of the present invention, there are no limitations as to where data can come from. Multiple inputs and/or multiple stored data can be combined into the selection index. Inputs could be from, e.g., such devices as global positioning (GPS) devices, digitized aerial photographs, moisture probes, load cells, soil probes, near infrared (NIR) devices, and other sources.

Global positioning devices could be used to correct yield for variation in field productivity level. Productivity maps of the field can be stored in the computer and then accessed from information provided from the GPS unit, and then the trait of interest can be corrected. Soil probes could be used in a similar manner. Aerial photographs could be taken as the crops mature and scanned into the computer. The color of the plots as they mature could be used to calculate maturity, and GPS or placement in the field could be used to calculate maturity of plots. GPS units could be used to assign latitude and longitude coordinates to tract plots replacing tier row coordinates. NIR devices could be used to select lines with higher protein or oil levels, or to select lines with modified oils or protein, e.g., high or low oleic acid, palmitic acid, lenolinic acid, lysine, methionine, etc. Weight could be combined with volume and density to calculate seed size. (Density could be observed by lining the cylinder with metal strips and then using the controller computer to generate a high frequency current through these strips. The change in frequency could be observed with the frequency counter in the controller computer because the frequency will change with density.)

The present techniques can also be used with all harvesting equipment, including, e.g., all types of combines, small bundle equipment, single plant threshers, corn ear sheller, etc. For those traits where NIR calibration have been established, a holding bin could be added below the single plant thresher which would contain an infrared sensing chamber. Below this could be a Y valve which would direct the seed to a dump container or a seed tray. A series of Y valves below this could be used to divert the seed to the proper cell within a row of a tray, and an advancement system similar to those used on plot planters could be used to advance to the next row.

For corn these techniques are applied to inbred selection, when single ears are selected. Inbreds are generated by several cycles of inbreeding after an initial cross. In each cycle the progeny from a single ear will be planted in a single row. The best ears are usually selected and advanced. In the case of high oil or high protein corn, this selection may involve DNA analysis while the crop is growing, visual selection of the ears to determine yield, followed by laboratory analysis on the seed. A similar approach as the previous soybean example is used. An NIR device is mounted below a corn sheller. Samples are saved or discarded based on an index including DNA analysis and maturity recorded before harvest and the following parameters recorded at harvest: Moisture, weight, volume and NIR parameters such as protein and oil or the profile of each of these as determined by NIR.

The present techniques could also be applied to animal harvesting selections. For example, several sources could be combined to select individuals that will be retained to breed from those that will be sold at market.

While the present invention has been shown and described with reference to preferred embodiments presently contemplated as best modes for carrying out the invention, it is understood that various changes may be made in adapting the invention to different embodiments without departing from the broader inventive concepts disclosed herein and comprehended by the claims which follow.

What is claimed is:

1. A method of culling product directly on a harvesting apparatus, comprising the steps of:
    sequentially collecting test samples from a plurality of plots that are harvested;
    using a computer to calculate a check index from a set of check varieties in certain plots;
    using the computer to calculate an index of a current test sample at a current plot on board the harvesting apparatus;
    using the computer to select whether to discard or to save the current test sample while on board the combine based on a comparison of the current index and the check index.

2. The method of claim 1, wherein said check index is a threshold index value.

3. A method of culling test samples on a harvesting apparatus, comprising the steps of:
    designating a plurality of plots of product to be harvested;
    sequentially collecting test samples from the plots on a harvesting apparatus;
    storing test data pertaining to the product in a computer system on the harvesting apparatus;
    collecting current data pertaining to a current test sample at a current plot on board the harvesting apparatus;
    selecting with the computer whether to discard or to save the current test sample while on board the harvesting apparatus based on the current data and said stored test data.

4. The method of claim 3, wherein the product harvested are plant lines.

5. The method of claim 4, wherein the plant lines are soybean.

6. The method of claim 4, wherein the plant lines are corn.

7. The method of claim 4, wherein said plant lines are a member of the group consisting of sorghum, wheat, rice, barley, sunflowers, canola, cotton, tomatoes, peppers, onions, beans, lettuce, melon, broccoli and cauliflower.

8. The method of claim 4, further including the steps of:
    designating a plurality of test areas having a plurality of rows and a plurality of tiers, each of the plots being at a specific row and tier;
    designating certain plots as checks;
    selecting whether to save or discard samples based on data collected at at least some of the checks, the stored test data including the data collected at the checks.

9. The method of claim 8, further including the step of calculating a selection index value for each test sample based on at least some of the stored test data and the collected data, and said step of selecting including comparing the selection index for each test sample with a corresponding check index value that is based on the data collected at the checks.

10. The method of claim 8, further including the step of calculating a selection index value for each test sample based on at least some of the stored test data and the collected data, and said step of selecting, wherein said selecting current test sample is based on a selection index ranking.

11. The method of claim 8, further including the step of: arranging the test areas with the checks aligned in specific rows across each test area so that the checks can be harvested first and dumping of samples can begin as early as possible.

12. The method of claim 9, wherein the selection index value is the sum of traits which are weighted by a coefficient expressing the relative importance of each trait.

13. The method of claim 12, wherein said selection index value is calculated by regression on board a harvesting apparatus.

14. The method of claim 12, wherein the selection index value is the sum of factors which are weighted by a coefficient equalizing differences in the units of measure.

15. The method of claim 9, further including the step of obtaining the check index value by at least one method selected from the group consisting of (1) a mean of the checks method, (2) a high check method, (3) a low check method, (4) a save all method, and (5) a save the top number of selected lines method.

16. The method of claim 15, wherein said step of selecting further includes increasing the check value by multiplying the check value by a factor greater than one.

17. The method of claim 15, wherein said step of selecting further includes decreasing the check value by multiplying the check value by a factor less than one.

18. A harvesting culling apparatus for selecting harvested test samples, comprising:

a harvesting apparatus;

a collector for receiving product from the harvesting apparatus;

a measuring compartment for receiving product from the collector;

a first valve between an outlet of the collector and the measuring compartment;

a second valve at a discharge end of the measuring compartment; and a computer system for 1) inputting parameters pertaining to a plurality of plots of product to be harvested, 2) storing test data pertaining to the product, 3) collecting current data pertaining to a current test sample at a current plot on board the harvesting apparatus, and 4) selecting whether to discard or to save the current test sample while on board the harvesting apparatus based on the current data and said stored test data.

19. The apparatus of claim 18, wherein said harvesting apparatus is a combine for harvesting plant lines.

20. The apparatus of claim 19, wherein said harvesting apparatus is a combine for harvesting soybean lines.

21. The apparatus of claim 18, wherein said harvesting apparatus is a single plant thresher.

22. The apparatus of claim 18, wherein said harvesting apparatus is a single head thresher.

23. The apparatus of claim 18, wherein said harvesting apparatus is a small bundle thresher.

24. The apparatus of claim 18, wherein said harvesting apparatus is an ear sheller for harvesting corn inbred ears.

25. The apparatus of claim 18, wherein said computer system includes a control computer and an analytical computer.

26. The apparatus of claim 18, wherein said collector is a cyclone.

27. The apparatus of claim 18, wherein said test data includes one or more traits of the group consisting of field data, laboratory data, GPS data, weather data and soil nitrogen at planting, midseason and harvest.

28. The apparatus of claim 18, wherein said current data includes yield.

29. The apparatus of claim 18, wherein the current data includes one or more traits of the group consisting of protein, oil, protein profile, oil profile and isoflavones.

30. The apparatus of claim 28, wherein the yield is measured by a sensor which measures the product in the measuring compartment.

31. The apparatus of claim 30, wherein said sensor is an ultrasonic sensor.

32. The apparatus of claim 30, wherein said sensor is a near infra red sensor.

33. The apparatus of claim 30, wherein said sensor is a load cell.

34. The apparatus of claim 30, wherein said sensor is a moisture tester.

35. The apparatus of claim 30, wherein the measuring compartment includes means for visual determination of the yield by the operator.

36. The apparatus of claim 35, wherein the means for visual determination includes a window having product level indicia thereon.

37. The apparatus of claim 30, further including a discharge chute at a discharge outlet of the measuring compartment, and a discharge bag arranged to receive product discharged in said discharge chute.

38. The apparatus of claim 37, further including at least one of a) an automatic packaging apparatus proximate the discharge outlet of the measuring compartment and b) an indicator for alerting the operator to place the product to be saved in a package.

39. The apparatus of claim 38, further including a storage container for placing packaged product.

* * * * *